(12) United States Patent
Hayashida et al.

(10) Patent No.: US 7,467,480 B2
(45) Date of Patent: Dec. 23, 2008

(54) DIGITAL DISPLACEMENT MEASURING INSTRUMENT

(75) Inventors: Shuji Hayashida, Kawasaki (JP); Shozaburo Tsuji, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 40 days.

(21) Appl. No.: 11/812,891

(22) Filed: Jun. 22, 2007

(65) Prior Publication Data
US 2008/0010850 A1 Jan. 17, 2008

(30) Foreign Application Priority Data
Jun. 26, 2006 (JP) ............................. 2006-175118

(51) Int. Cl.
*G01B 3/18* (2006.01)
(52) U.S. Cl. .............................. 33/813; 33/819; 33/831
(58) Field of Classification Search ................... 33/813, 33/814, 815, 816, 818, 819, 820, 821, 831, 33/783, 784, 792, 794
See application file for complete search history.

(56) References Cited

U.S. PATENT DOCUMENTS

| | | | | |
|---|---|---|---|---|
| 2,338,001 A | * | 12/1943 | La Vigne | 33/813 |
| 3,514,865 A | * | 6/1970 | Karahashi | 33/816 |
| 4,207,679 A | * | 6/1980 | Poage | 33/819 |
| 5,495,677 A | * | 3/1996 | Tachikake et al. | 33/784 |
| 5,920,198 A | * | 7/1999 | Suzuki et al. | 324/662 |
| 6,260,286 B1 | * | 7/2001 | Suzuki et al. | 33/813 |
| 7,013,576 B2 | | 3/2006 | Hayashida et al. | |
| 7,043,852 B2 | * | 5/2006 | Hayashida et al. | 33/813 |

FOREIGN PATENT DOCUMENTS

| | | |
|---|---|---|
| EP | 1 486 753 A2 | 12/2004 |
| JP | 2006170904 A * | 6/2006 |
| JP | 2007285814 A * | 11/2007 |

* cited by examiner

*Primary Examiner*—R. Alexander Smith
(74) *Attorney, Agent, or Firm*—Oliff & Berridge, PLC (57) ABSTRACT

A rotation transmitter (44) includes a rotor support member (440) provided on an outer circumference of a spindle (2), a rotary piece (45) provided with an engaging portion (46) that is adapted to be engaged with an engaging groove (23), and a coil spring (48) provided between the rotary piece (45) and the rotor support member (440). The rotary piece (45) is supported by the rotor support member (440) in a manner rotatable in a circumferential direction of a rotation shaft (441) provided parallel to the axis of the spindle (2) and the coil spring (48) biases the engaging portion (46) onto the engaging groove (23) via the rotary piece (45).

6 Claims, 6 Drawing Sheets

DIGITAL DISPLACEMENT MEASURING INSTRUMENT

BACKGROUND OF THE INVENTION

1. Field of the Invention

The present invention relates to a digital displacement measuring instrument for measuring a dimension of an object to be measured based on an axial displacement of a spindle.

2. Description of Related Art

A digital micrometer, one of widely-used digital displacement measuring instrument, includes a body, a spindle screwed into the body in a manner capable of axial advancement and retraction, an encoder for detecting a displacement of the spindle and a display for digitally displaying the displacement of the spindle calculated based on a detected value of the encoder.

The encoder has an opposing arrangement of a stator fixed onto the body and a rotor capable of synchronized rotation with the spindle, where the rotation (angle) of the rotor relative to the stator is detected to measure the displacement of the spindle relative to the body.

Figure 5:
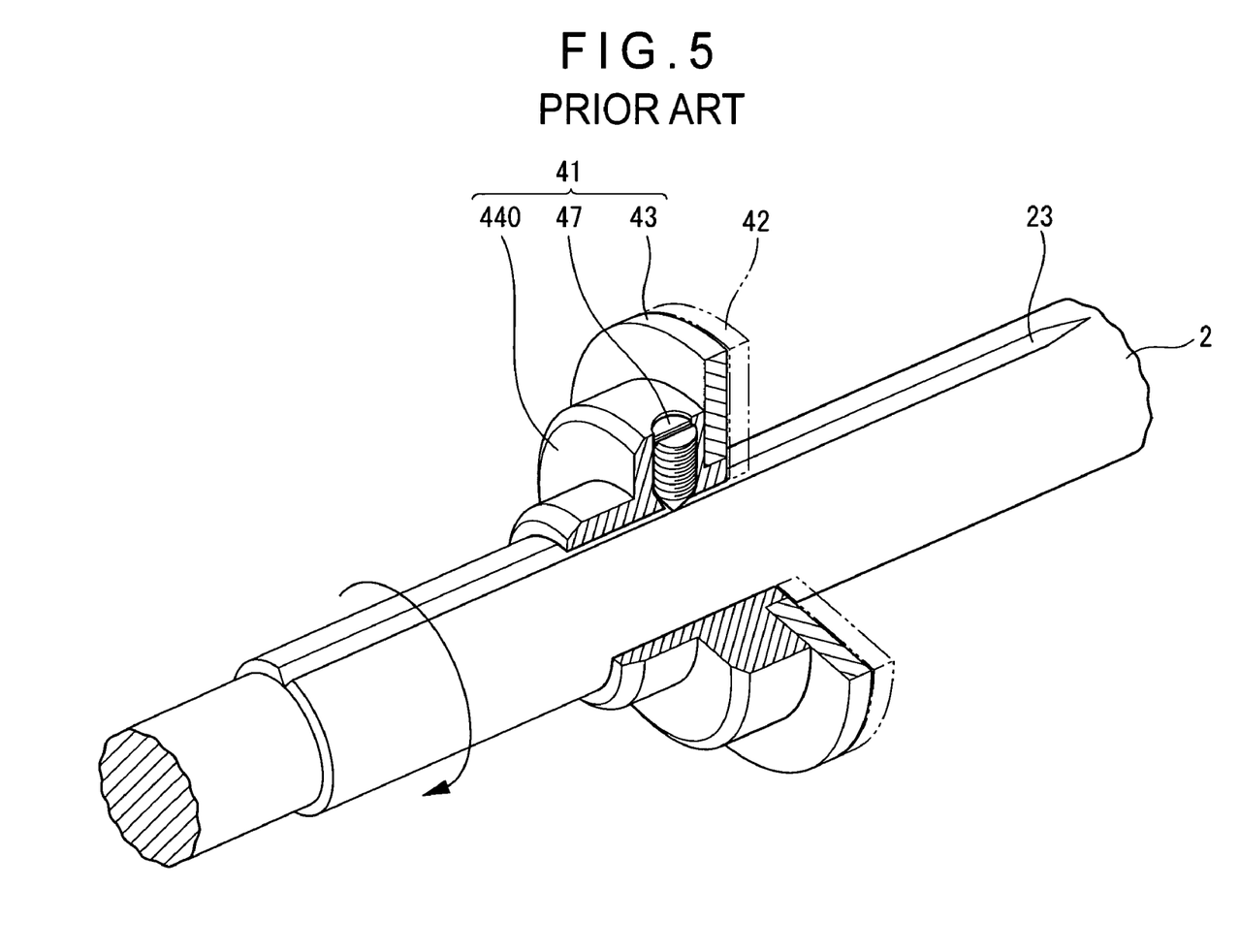
FIG. 5 is a perspective view showing a conventional digital micrometer from which a part of a rotor section is taken away.
Figure 6:
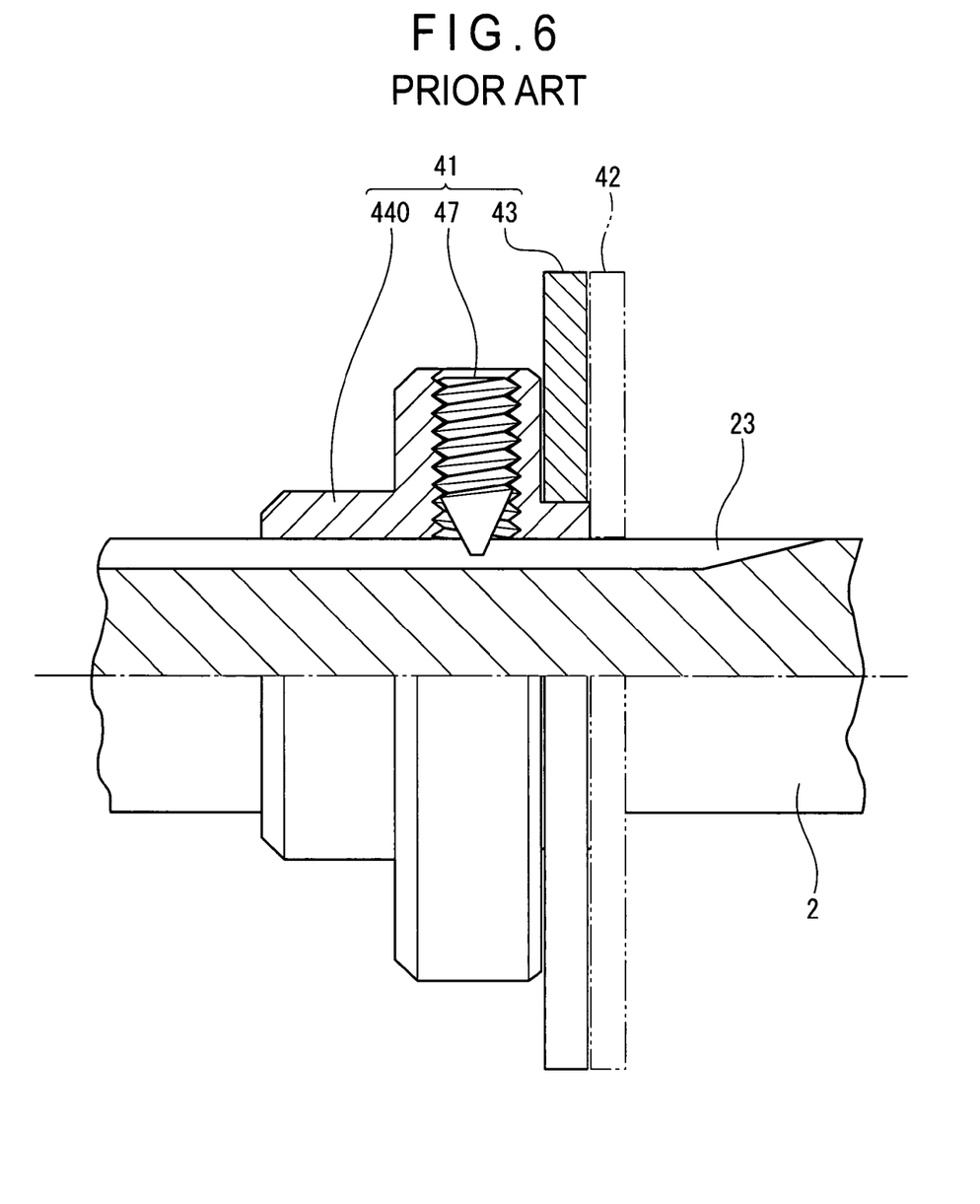
FIG. 6 is a cross section showing a rotor section of the conventional digital micrometer.

An arrangement of a rotor section 41 of a conventional digital micrometer is shown in FIGS. 5 and 6. The rotor 43 is supported by a rotor support member 440 having an engaging key 47. An engaging groove 23 is provided on an outer circumference of a spindle 2 in the axial direction thereof, the engaging key 47 being engaged with the engaging groove 23. Accordingly, the rotor 43 is held at a fixed position to keep a constant gap against the stator 42 irrespective of the axial movement of the spindle 2.

The spindle 2 is advanced and retracted in the axial direction relative to the digital micrometer body while being rotated in circumferential direction. Then, the rotor support member 440 is also rotated in synchronization with the spindle 2, so that the rotary angle of the rotor 43 relative to the stator 42 is detected, which is converted into the displacement of the spindle 2 to be digitally displayed.

As described above, a digital micrometer employs a rotation-transmitting mechanism that transmits the rotation of the spindle while keeping a constant gap between the stator and the rotor, which includes the combination of an engaging groove formed on the outer circumference of the spindle in the axial direction, an engaging key adapted to be engaged into the engaging groove and a rotor support member having the engaging key.

However, a rotary transmission error may be caused in accordance with depth position of the engaging key in such rotation-transmitting mechanism.

For instance, when there is a gap between the tip end of the engaging key and the engaging groove, a loose area in which the rotation of the spindle is not transmitted to the engaging key is generated in the gap, which results in the rotation transmission error. On the other hand, smooth advancement and retraction of the spindle is impaired when the engaging key is firmly pressed onto the engaging groove.

In order to avoid the above disadvantages, the depth position of the engaging key has to be accurately adjusted at a position that allows contact between the tip end of the engaging key and the engaging groove while avoiding excessive pressure on the engaging groove by the engaging key. However, such adjustment requires very accurate work and difficulties.

In view of the above, a new digital displacement measuring instrument has been developed, where an engaging key is pressed toward the engaging groove and the engaging key and the engaging groove are engaged without gap with the use of a plate spring and the like (document: U.S. Pat. No. 7,013,576).

However, in the above document, workability for assembling the rotor section and the engaging key onto the spindle is not so excellent.

In order to install the rotor section and the engaging key onto the spindle, following two methods can be considered.

The first method is to assemble a rotor section onto a spindle, and, subsequently, an engaging key and a plate spring are installed onto a rotor support member. Since the rotor section is liable to rotate in the axial direction of the spindle in the above method, it is necessary to conduct the assembling work while pressing the rotor section to prevent rotation, which considerably deteriorates workability.

In the second method, after an engaging key and a plate spring is installed on a rotor support member, a rotor section is assembled onto the spindle. In this method, however, the engaging key is likely to be dropped off before installation.

SUMMARY OF THE INVENTION

A primary object of the present invention is to provide a digital displacement measuring instrument requiring no minute depth adjustment of an engaging key, capable of facilitating assemble of a rotor section onto a spindle and reducing rotation transmission error while allowing smooth advancement and retraction of the spindle.

A digital displacement measuring instrument according to an aspect of the present invention includes: a body; a spindle screwed into the body to be axially advanced and retracted relative to the body; and an encoder that detects a displacement of the spindle, the encoder including a rotor rotating in a circumferential direction of the spindle and a stator spaced apart from the rotor by a predetermined gap and fixed onto the body, the rotor being supported by a rotation transmitter having an engaging portion to be engaged with an engaging groove provided on an outer circumference of the spindle in the axial direction while keeping a constant gap against the stator, in which the rotation transmitter has a rotor support member for supporting the rotor, a rotary piece having the engaging portion to be engaged with the engaging groove and a biasing unit provided between the rotary piece and the rotor support member, the rotary piece is supported by the rotor support member in a manner circumferentially rotatable around a rotation shaft provided parallel to the axis of the spindle, and the biasing unit biases the engaging portion onto the engaging groove via the rotary piece.

According to the above aspect of the present invention, since the engaging portion is pressurized onto the engaging groove with an appropriate force to keep the engaging portion constantly in contact with the engaging groove, no accurate depth adjustment of an engaging key is necessary and rotation transmission error can be reduced while allowing smooth advancement and retraction of the spindle.

Further, by rotating the rotary piece in a direction reverse to the pressurizing direction of the biasing unit, the engaging portion can be moved away from the spindle, so that the rotor section can be easily installed on the spindle.

In the above aspect of the present invention, it is preferable that the rotation shaft is provided approximately at the center of the rotary piece, and the engaging portion is provided on an end of the rotary piece and the biasing unit is provided on the other end of the rotary piece.

According to the above arrangement, since the rotary piece can be rotated to move the engaging portion away from the spindle by pressing the other end of the rotary piece against the biasing force, the rotor section can be further easily installed onto the spindle.

The digital displacement measuring instrument of the above aspect of the present invention may preferably include a biasing-force adjusting unit that adjusts a biasing force applied by the biasing unit.

According to the above arrangement, the provision of the biasing-force adjusting unit for adjusting the biasing force applied by the biasing unit allows adjustment of the biasing force for biasing the engaging portion onto the engaging groove.

In the above aspect of the present invention, the biasing unit may preferably include a coil spring.

According to the above arrangement, since the biasing unit includes a coil spring, the biasing unit can be easily installed between the rotary piece and the rotor support member. Further, the biasing force can be adjusted by changing the length of the coil spring. Since a coil spring is inexpensive and is readily available, production cost can be reduced.

In the above aspect of the present invention, the biasing unit may preferably include a coil spring, and the biasing unit may preferably include a spring force adjusting screw that adjusts the biasing force by compressing the coil spring.

According to the above arrangement, since the biasing unit includes the spring force adjusting screw that adjusts the biasing force by compressing the coil spring, the biasing force can be easily and minutely adjusted by rotating the spring-pressure adjusting screw.

In the above aspect of the present invention, the engaging portion may preferably have a spherical tip end to be engaged with the engaging groove.

According to the above arrangement, since the tip end of the engaging portion is spherically shaped and the tip end of the engaging portion is in contact with the engaging groove at two points, the rotation of the spindle can be securely transmitted to the rotor section and the slide movement of the rotor section in the axial direction of the spindle can be smoothly conducted.

DETAILED DESCRIPTION OF PREFERRED EMBODIMENT(S)

An exemplary embodiment of the present invention will be described below with reference to drawings.

Figure 1:
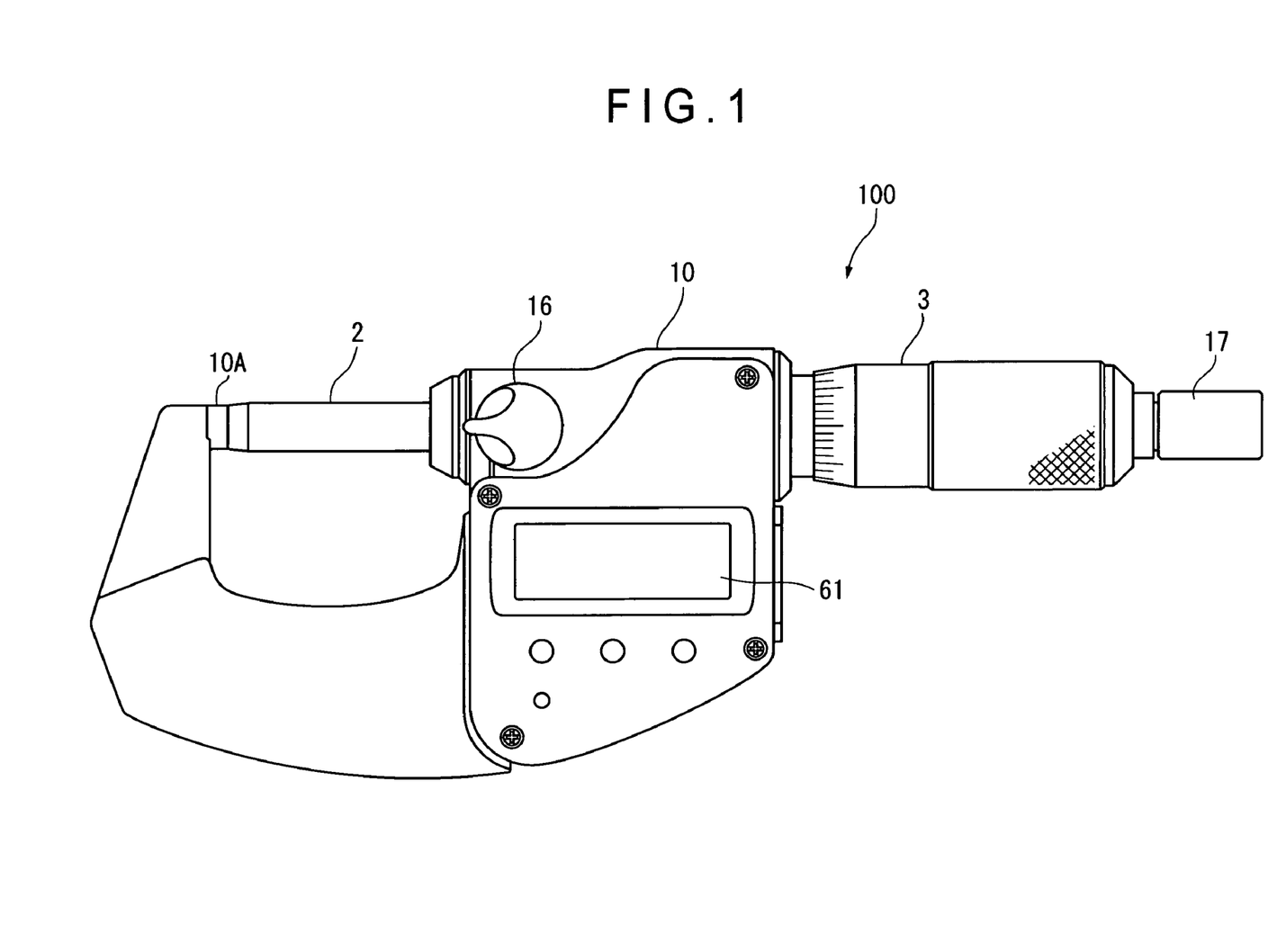
FIG. 1 is a front elevation showing a digital micrometer according to an exemplary embodiment of the invention.
Figure 2:
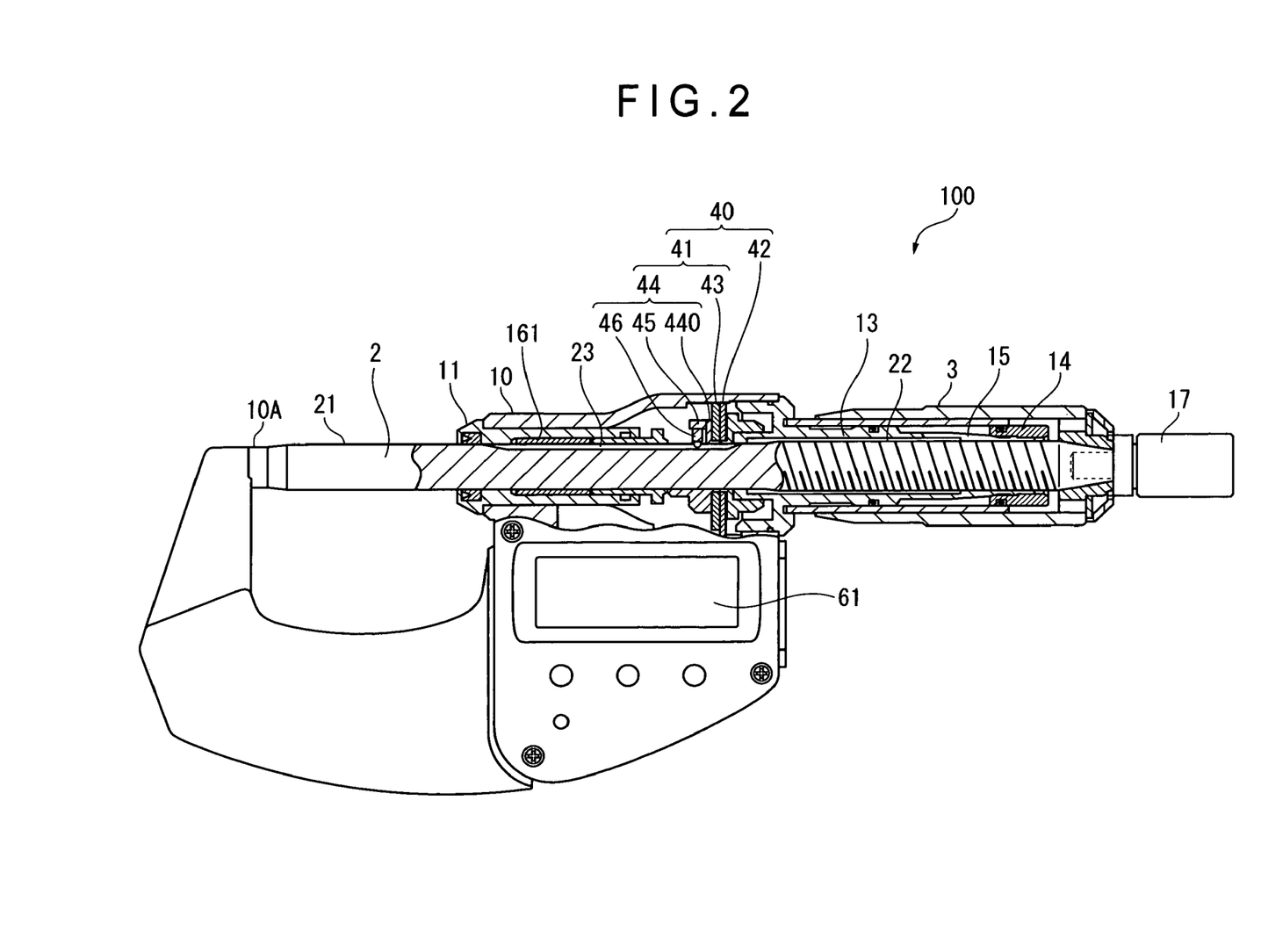
FIG. 2 is a partial cross section showing the digital micrometer according to the exemplary embodiment.

FIG. 1 is a front elevation of digital micrometer according to the present exemplary embodiment and FIG. 2 is a partial cross section thereof.

In FIGS. 1 and 2, the digital micrometer 100 has a substantially U-shaped body 10, a spindle screwed into the body 10 to be advanced and retracted in an axial direction thereof, an encoder 40 provided inside the body 10 to detect the displacement of the spindle 2 and a display 61 for displaying a measured value.

An anvil 10A is rigidly mounted on an end of the body 10 and a sleeve 11 (support member) for supporting the spindle 2 in a slidable manner is provided on the other end of the body 10A. The sleeve 11 is formed in a substantially cylindrical form, in which the spindle 2 is inserted to be supported. A clamping collar 161 is provided on the inner circumference of the sleeve 11 along the axial direction thereof. A clamp screw 16 is provided outside the body 10, which is manipulated to tighten the spindle 2, thereby restricting the slide movement of the spindle 2. An approximately cylindrical inner cylinder 13 is provided on the body 10. A thimble 3 provided on the outer circumference of the inner cylinder 13 is rotated to advance and retract the spindle 2 relative to the anvil 10A.

The spindle 2 includes a spindle body 21 and a threaded shaft 22 that are linearly disposed. The spindle 2 also has an engaging groove 23 axially provided on the outer circumference of the spindle body 21. The spindle body 21 and the threaded shaft 22 may be formed from a single cylinder member or, alternatively, formed of separate components. The engaging groove 23 has a V-shaped cross section. The inner cylinder provided along the axial direction of the spindle 2 has a first end held by the body 10 and a second end carved with female screw on the inner circumference thereof to be engaged with the threaded shaft 22 of the spindle 2.

A male screw is carved on the outer circumference of the inner cylinder 13, to which a tapered nut 4 is screwed. Three notches are provided on a predetermined sections of the inner cylinder 13 at which the male screw is carved to define a three-way split portion. The tapered nut 14 is a component for adjusting fit of the spindle 2 and the inner cylinder 13. When the tapered nut 14 is rotated to advance and retract the tapered nut 14 along the axial direction of the inner cylinder 13, the tightness applied by the three-way split portion is changed to vary the inner diameter of the inner cylinder 13. As described above, the change in the inner diameter of the inner cylinder 13 allows adjustment of the fit of the spindle 2 and the inner cylinder 13.

A ratchet 17 for holding an object to be measured with a constant pressure is provided on an end of the spindle 2 to prevent damage on the object by applying excessive pressure when the object is held against the anvil 10A by advancing and retracting the spindle 2.

The encoder 40 is an electrostatic encoder, which includes a rotor section 41 rotating in circumferential direction of the spindle 2 and a stator 42 fixed on the body 10 being spaced apart from the rotor section 41 by a predetermined gap.

The stator 42 has a disc-shaped stator ring provided opposing to the outer circumference of the spindle 2 and a plate-shaped stator extension provided on the outer circumference of the stator ring to be stretched toward the inside of the body 10. The stator extension is fixed to the body 10 in the inside of the body 10.

Figure 3:
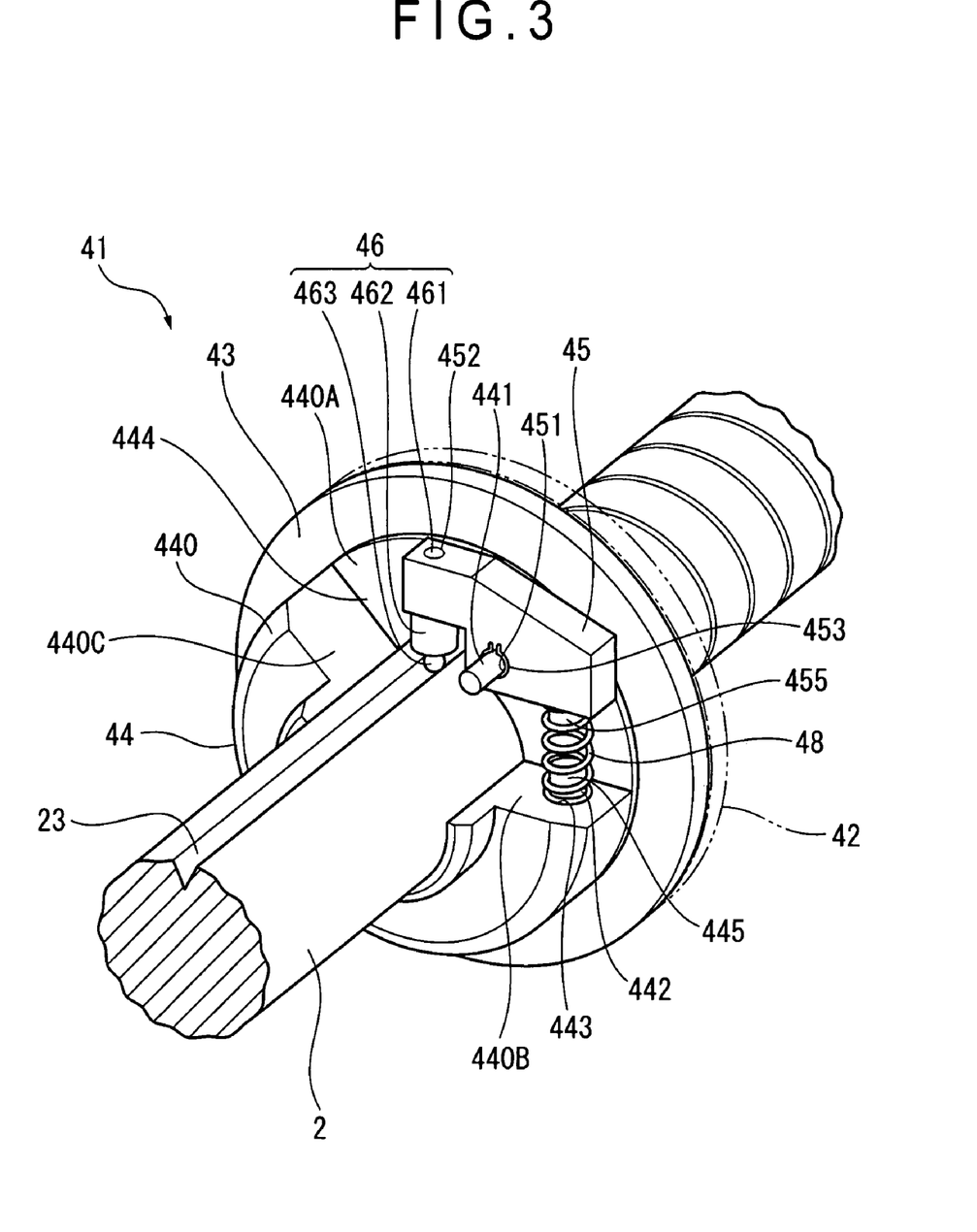
FIG. 3 is a perspective view showing the digital micrometer according to the exemplary embodiment.
Figure 4:
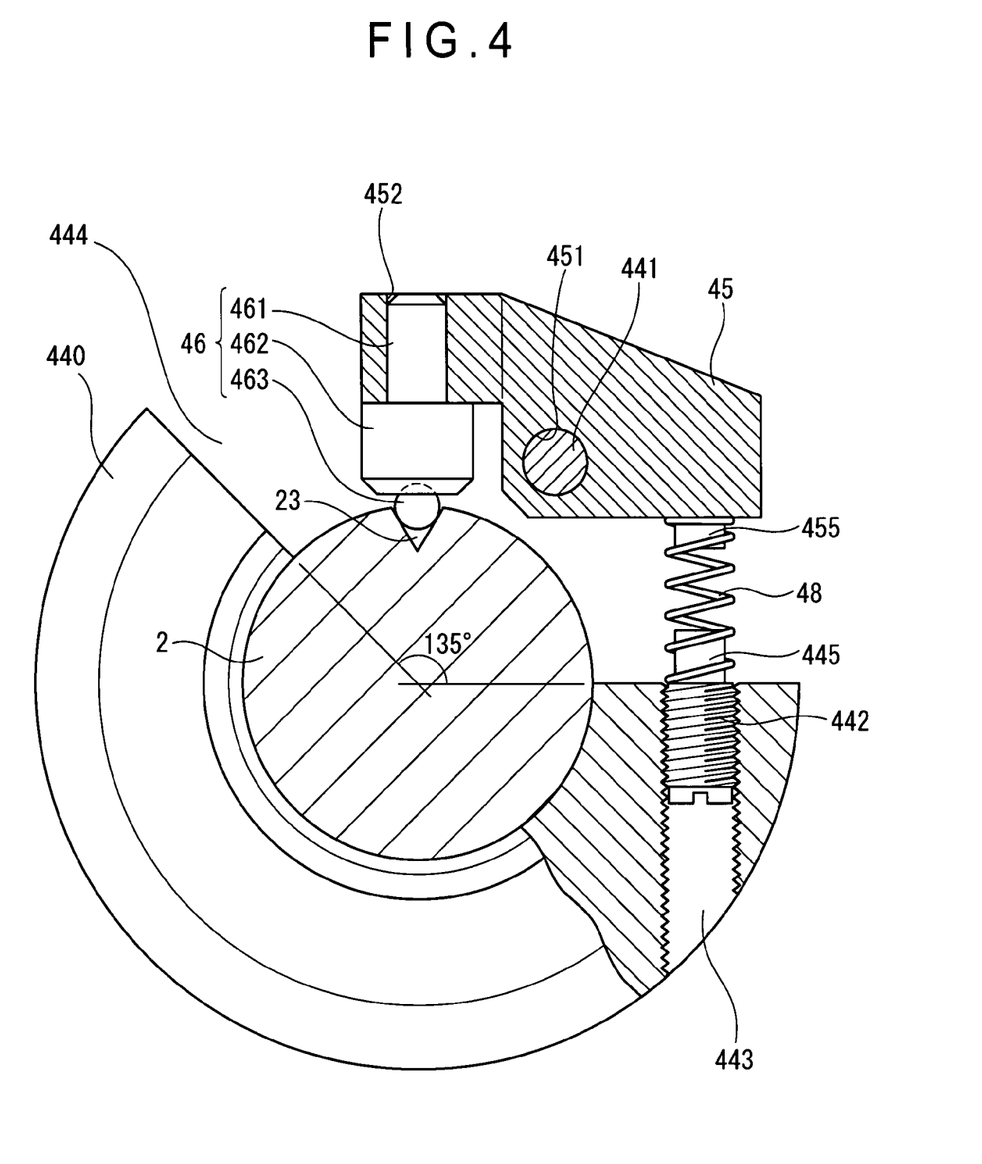
FIG. 4 is a partial cross section showing a rotor section of the digital micrometer according to the exemplary embodiment.

The detailed arrangement of the rotor section 41 of the digital micrometer 100 according to the exemplary embodiment is shown in FIGS. 3 and 4.

In FIGS. 3 and 4, the rotor section 41 has a rotation transmitter 44 provided on the outer circumference of the spindle 2, and a disc-shaped rotor 43 supported by the rotation transmitter 44 while keeping a constant gap against the stator 42.

The rotation transmitter 44 has a rotor support member 440 for supporting the rotor 43, a rotary piece 45 having an engaging portion 46 to be engaged with the engaging groove 23 and a coil spring 48 (biasing unit) provided between the rotary piece 45 and the rotor support member 440.

The rotor support member 440 is an approximately cylindrical member, which includes a sector-plate notch 444 having center angle 135° around the axis of the spindle 2. The notch 444 defines a cutting face 440A perpendicular to the axis of the spindle 2 and cutting faces 440B and 440C parallel to the axis of the spindle 2 on the rotor support member 440.

A cylindrical rotation shaft 441 parallel to the axis of the spindle 2 is provided on the cutting face 440A of the rotor support member 440. The rotation shaft 441 is inserted into a center hole 451 provided on the rotary piece 45, the rotation shaft 441 supporting the rotary piece 45 in a manner rotatable along the circumferential direction of the rotation shaft 441. A stop ring 453 is in elastic engagement with the rotation shaft 441 adjoining a surface of the rotary piece 45 on the side of the anvil 10A to fix the rotary piece 45 in the axial direction of the spindle 2.

A threaded hole 443 perpendicular to the cutting face 440B and a spring-pressure adjusting screw 442 are provided on the cutting face 440B as a biasing-force adjusting unit. The spring-pressure adjusting screw 442 has a threaded shaft screwed into the threaded hole 443 and a cylindrical protrusion 445 provided on an end opposing to the rotary piece 45 to be engaged with an end of the coil spring 48.

The rotary piece 45 is a substantially rectangular parallelepiped component, approximately at the center of which a center hole 451 for receiving the rotation shaft 441 is provided. Around the rotation shaft 441, an engaging-portion-inserting hole 452 for inserting and supporting the engaging portion 46 is provided on an end of the rotary piece 45 and a cylindrical protrusion 455 engaged with another end of the coil spring 48 is provided on the other end of the rotary piece 45.

The engaging portion 46 has a base end 461 to be inserted into the engaging-portion-inserting hole 452, a cylindrical trunk portion 462 and a spherical tip end 463.

The base end 461 is provided on an end of the trunk portion 462 on the side of the rotary piece 45 in a manner that the axis thereof is coaxial with the axis of the trunk portion 462. The base end 461 is inserted into the engaging-portion-inserting hole 452 to be fixed onto the rotary piece 45.

The spherical tip end 463 is provided at the center of the end of the trunk portion 462 on the side of the spindle 2. The tip end 463 is in contact with the engaging groove 23 at two points.

The coil spring 48 has an end engaged with the protrusion 455 provided on the bottom side of the rotary piece 45 and the other end engaged with the protrusion 445 provided on the cutting face 440B of the rotor support member 440. Accordingly, the rotary piece 45 is rotated counterclockwise in FIG. 4 around the rotation shaft 441 to bias the engaging portion 46 onto the engaging groove 23.

The digital micrometer 100 according to the exemplary embodiment is used as follows.

In installing the rotor section 41 onto the spindle 2, the upper side of the rotary piece 45 is pressed by a finger and the rotary piece 45 is rotated in a direction for compressing the coil spring 48. Then, the engaging portion 46 is moved away from the spindle 2, so that the rotor section 41 can be easily installed on the spindle 2. Further, when the spring-pressure adjusting screw 442 is rotated to compress or decompress the coil spring 48, the biasing force for biasing the engaging portion 46 onto the engaging groove can be adjusted.

During measurement, the thimble 3 is rotated to advance and retract the spindle 2 relative to the anvil 10A to bring an end of the spindle 2 and the anvil 10A into contact with target portions of an object to be measured. At this time, the rotation of the spindle 2 is transmitted to the rotor 43 through the rotation transmitter 44. The rotary angle of the rotor 43 detected by the encoder 40 is converted into the axial displacement of the spindle 2 to be displayed on the display 61.

Since the engaging portion 46 is biased onto the engaging groove 23 with an appropriate biasing force and the engaging portion 46 and the engaging groove 23 are always in contact with each other, the rotation transmission error can be reduced while allowing the smooth advancement and retraction of the spindle 2. Further, since the tip end 463 of the engaging portion 46 and the engaging groove are abutted at two points, the rotation of the spindle 2 can be securely transmitted to the rotor 43 and the slide movement of the rotor section 41 in the axial direction of the spindle 2 can be smoothly conducted.

Incidentally, the scope of the present invention is not limited to the above exemplary embodiments, but includes modifications and improvements as long as an object of the present invention can be achieved.

(i) Though a single engaging portion 46 is provided on the rotation transmitter 44 and a single engaging groove 23 is provided on the spindle 2 in a corresponding manner, other arrangement is possible. For instance, a plurality of engaging portion 46 may be provided on the rotation transmitter 44 and, corresponding thereto, a plurality of engaging grooves 23 may be provided on the outer circumference of the spindle 2 in the axial direction. In the above arrangement, since the plurality of engaging portions 46 are engaged on the spindle 2 in a slidable manner, the rotor section 41 can be more securely positioned on the spindle 2, so that shaky movement is not generated between the spindle 2 and the rotor section 41.

(ii) Any digital encoder capable of detecting the rotation of the rotor 43 relative to the stator 42 may be used for the encoder 40, which is not limited to the electrostatic encoder mentioned in the exemplary embodiment. For instance, an optical encoder and an electromagnetic encoder may alternatively be used.

(iii) Though the digital displacement measuring instrument is exemplified by the digital micrometer 100 in the above exemplary embodiment, the present invention can be applied on the other measuring instrument. For instance, the present invention may be applied on any mechanisms such as a digital micrometer head, where a spindle 2 screwed into the body 10 and axially advanced and retracted relative to the body 10 and an encoder 40 for detecting the displacement of the spindle 2 are provided.

The priority application Number JP 2006-175118 upon which this patent application is based is hereby incorporated by reference.

What is claimed is:

1. A digital displacement measuring instrument, comprising:
    a body;
    a spindle screwed into the body to be axially advanced and retracted relative to the body; and
    an encoder that detects a displacement of the spindle,
    the encoder including a rotor rotating in a circumferential direction of the spindle and a stator spaced apart from the rotor by a predetermined gap and fixed onto the body,
    the rotor being supported by a rotation transmitter having an engaging portion to be engaged with an engaging groove provided on an outer circumference of the spindle in the axial direction while keeping a constant gap against the stator, wherein the rotation transmitter has a rotor support member for supporting the rotor, a rotary piece having the engaging portion to be engaged with the engaging groove and a biasing unit provided between the rotary piece and the rotor support member, the rotary piece is supported by the rotor support member in a manner circumferentially rotatable around a rotation shaft provided parallel to the axis of the spindle, and the biasing unit biases the engaging portion onto the engaging groove via the rotary piece.

2. The digital displacement measuring instrument according to claim 1, wherein the rotation shaft is provided approximately at the center of the rotary piece, and the engaging portion is provided on an end of the rotary piece and the biasing unit is provided on the other end of the rotary piece.

3. The digital displacement measuring instrument according to claim 1, further comprising a biasing-force adjusting unit that adjusts a biasing force applied by the biasing unit.

4. The digital displacement measuring instrument according to claim 3, wherein the biasing unit includes a coil spring, wherein the biasing unit includes a spring force adjusting screw that adjusts the biasing force by compressing the coil spring.

5. The digital displacement measuring instrument according to claim 1, the biasing unit comprising a coil spring.

6. The digital displacement measuring instrument according to claim 1, wherein the engaging portion has a spherical tip end to be engaged with the engaging groove.

* * * * *